June 2, 1959    R. L. ROOF    2,889,124
MEANS FOR MOUNTING PLASTIC PARTS
Filed April 29, 1953

INVENTOR
RICHARD L. ROOF
BY Michael Hertz
ATTORNEY

2,889,124

MEANS FOR MOUNTING PLASTIC PARTS

Richard L. Roof, Buffalo, N.Y., assignor to Sylvania Electric Products Inc., a corporation of Massachusetts Application April 29, 1953, Serial No. 351,964

4 Claims. (Cl. 248—27)

This invention relates to means for mounting tube sockets, I.-F. transformer cans and the like on a metallic support such as a radio chassis.

In the past such parts had to be mounted either with the aid of rivets or the provision of additional elements such as pliable lugs or snap rings seated in grooves.

It is an object of this invention to simplify the securement of a member to a support.

It is a further object to obtain securement of parts without the use of elements additional to the parts themselves.

It is a further object of this invention to cheapen the cost of manufacture of a completed radio by facilitating assembly of some of its parts or devices with a support.

To attain these ends, the chassis or other support is provided with preferably symmetrically shaped noncircular holes cooperating with similarly shaped noncircular plug portions of mounts whereby after insertion of the mount within a hole and rotation thereof with respect to the support, the mount will be securely locked to the support.

All of this will be more clearly understood after consideration of the following specification and drawings in which—

Figure 1:
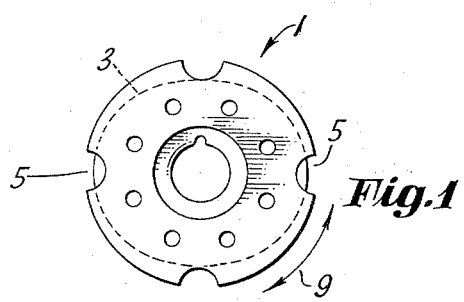
Fig. 1 is a plan view of a tube socket embodying the present invention.
Figure 2:
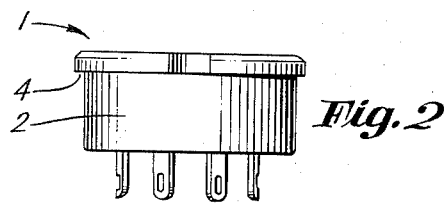
Fig. 2 is an elevational view of the socket.

In accordance with this invention there is provided an element such as the plastic material tube socket 1, Figs. 1 and 2, the upper surface of which may have any desired configuration. The socket has an elliptical peripheral plug portion 2 which in plan view is represented by the dotted line 3 in Fig. 1. Overhanging this elliptical portion is a flange portion 4. The flange portion has recesses 5 around the periphery, all made of the same size to facilitate easy turning movement of the socket, as will be explained hereafter.

Figure 3:
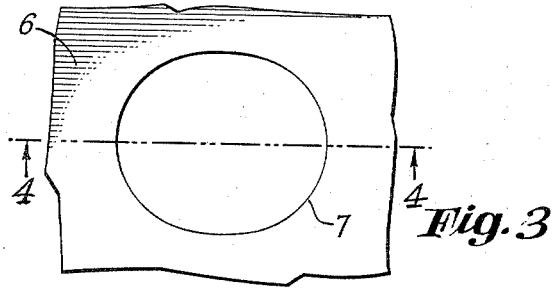
Fig. 3 is a plan view of a portion of a radio chassis showing an elliptical hole therein.
Figure 4:
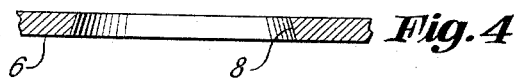
Fig. 4 is a cross section through Fig. 3 on the line 4—4 thereof.

The metal chassis 6, Figs. 3 and 4, has an elliptical opening 7 conforming in shape and size to the periphery of the elliptical socket portion whereby upon insertion of this portion into the chassis opening to a position where the flange engages the chassis and forceably turning one relative to the other, the edge of the chassis will cut into the portion 2 and lock the socket in place. In the case of an elliptical portion on the socket and an elliptical opening in the chassis, the most desirable final position of the socket would be with the major axis of the socket elliptical portion in alinement with the minor axis of the chassis opening. To facilitate the cutting action hereinbefore described, the chassis hole is desirably tapered as shown at 8 in Fig. 4, at an angle of approximately 15°, preferably, although not necessarily, with the smaller end of the tapered portion adjacent the socket flange 4.

The recesses 5 afford a means whereby the socket may be easily grasped manually or by a two or four pronged tool to effect the rotational movement of the socket.

Obviously with the arrangement shown, the socket may be rotated in either direction as indicated by the two ended arrow 9 in Fig. 1.

Figure 5:
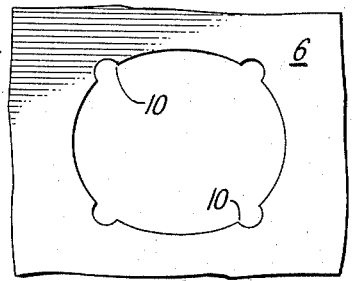
Fig. 5 is a plan view of a modified form of chassis opening.
Figure 6:
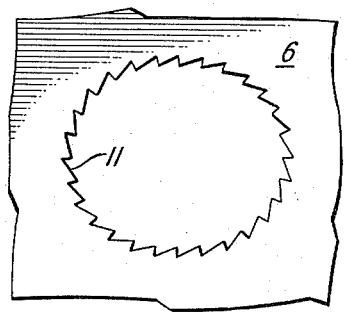
Fig. 6 is a plan view of still another modified form of chassis opening.

In order to secure a degree of resistance against accidental rotational movement of the socket in the chassis opening after the socket has been finally located, the edge of the opening in the chassis may be provided with indentations having sharp corners as at 10 in Fig. 5, or as shown at 11 in Fig. 6, the entire opening may be serrated.

Figure 7:
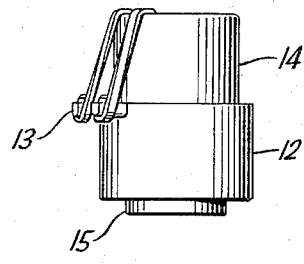
Fig. 7 is a view of an I.-F. coil mount with coil therein which may be mounted on the chassis in accordance with this invention.
Figure 8:
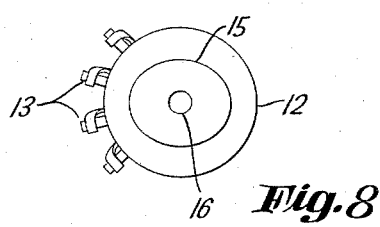
Fig. 8 is a bottom plan view of the mount of Fig. 7.

Although I have so far particularly described a tube socket secured to a chassis, it is obvious that other parts may be so mounted. As an example, there is shown in Figs. 7 and 8 a hollow cylindrical molded element 12 having conductive lugs 13 molded therein and housing an I.-F. transformer 14. The terminals of the transformer coils are affixed to the lugs 13. The molded element 12 has integral therewith an elliptical portion 15 of a size to fit a similarly shaped and sized opening in the chassis.

For convenience in wiring as when connections other than to the lugs 13 are desired and to provide for escape of air when a part is snugly fitted into the element 12, the elliptical portion 15 is provided with a central circular opening 16 leading into the receptacle portion of the element 12. Obviously the element 12, too, can be secured to the chassis by relative rotational movement of the element and the chassis.

It is obvious therefore that various devices may be provided with the noncircular portions as described hereinabove, and it should be further obvious that the noncircular portions and the support openings, whatever the support may be, need not necessarily be elliptical.

Having thus described my invention, what I claim is:

1. In combination with a radio chassis of some thickness having a noncircular opening with the walls of said opening tapering in the direction of thickness of the chassis, of a tube socket mounted in said opening, said socket having a noncircular skirt portion of a size substantially equal to the size of the opening and of a shape similar thereto, the skirt portion and the opening being out of register and with a portion of the wall of the tapered opening penetrating a portion of the wall of the noncircular skirt portion of the socket.

2. In combination, a flat surfaced support of appreciable thickness having a noncircular opening therein and which opening has wider and narrower dimensions, the walls of said opening being inclined with reference to the flat surface of the support to cause the opening to be tapered and to provide cutting edges at least at portions opposite a narrow dimension of the noncircular opening, a mounting member having a hole-engaging plug portion with a cross-sectional contour similar in shape and size to the contour of said opening, said mounting member being positioned in said opening with similar portions of said opening and plug portion out of registry, whereby the cutting edges penetrate into the wider dimensioned portions of the plug portion.

3. In combination, a flat surfaced support of appreciable thickness having a noncircular opening therein and which opening has wider and narrower dimensions, the walls of said opening being inclined with reference to the flat surface of the support to cause the opening to be tapered and to provide cutting edges at least at portions opposite a narrow dimension of the noncircular opening, a mounting member having a hole-engaging plug portion with a cross-sectional contour similar in shape and size to the contour of said opening, said mounting member being positioned in said opening with similar portions of said opening and plug portion out of registry, whereby the cutting edges penetrate into the wider dimensioned portions of the plug portion, said mounting having a flange portion adjacent the hole-engaging portion.

4. In combination, a flat surfaced support of appreciable thickness having a noncircular opening therein and which opening has wider and narrower dimensions, the walls of said opening being inclined with reference to the flat surface of the support to cause the opening to be tapered and to provide cutting edges at least at portions opposite a narrow dimension of the noncircular opening, a mounting member having a hole-engaging plug portion with a cross-sectional contour similar in shape and size to the contour of said opening, said mounting member being positioned in said opening with similar portions of said opening and plug portion out of registry, whereby the cutting edges penetrate into the wider dimensioned portions of the plug portion, said mounting having a flange portion adjacent the hole-engaging portion, and the smaller cross-sectional area of the tapered opening being adjacent the flange portion.

References Cited in the file of this patent

UNITED STATES PATENTS

| | | |
|---|---|---|
| 710,488 | Mauer | Oct. 7, 1902 |
| 1,273,986 | Azadian | July 30, 1918 |
| 2,000,732 | Zelt | May 7, 1935 |
| 2,448,213 | Doonan | Aug. 31, 1948 |
| 2,574,134 | Vigren et al. | Nov. 6, 1951 |
| 2,613,771 | Levine | Oct. 14, 1952 |

FOREIGN PATENTS

| | | |
|---|---|---|
| 243,202 | Great Britain | Nov. 26, 1925 |
| 558,868 | Great Britain | Jan. 25, 1944 |
| 661,120 | France | July 22, 1929 |